(12) United States Patent
Morales

(10) Patent No.: US 12,159,069 B1
(45) Date of Patent: Dec. 3, 2024

(54) METHODS FOR SMART SPOT COLOR MANAGEMENT IN PRINTING OPERATIONS

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 18/393,245

(22) Filed: Dec. 21, 2023

(51) Int. Cl.
*G06F 3/12* (2006.01)
(52) U.S. Cl.
CPC .......... *G06F 3/1208* (2013.01); *G06F 3/1204* (2013.01); *G06F 3/1205* (2013.01); *G06F 3/1252* (2013.01); *G06F 3/1254* (2013.01); *G06F 3/1257* (2013.01); *G06F 3/12* (2013.01)
(58) Field of Classification Search
None
See application file for complete search history.

(56) References Cited

U.S. PATENT DOCUMENTS

| 2008/0291479 | A1* | 11/2008 | Mestha | H04N 1/54 358/1.9 |
| 2015/0062651 | A1* | 3/2015 | Yano | G06K 15/4065 358/1.18 |
| 2023/0342091 | A1* | 10/2023 | Wushour | H04N 1/6033 |

\* cited by examiner

*Primary Examiner* — Darryl V Dottin
(74) *Attorney, Agent, or Firm* — Millen, White, Zelano & Branigan P.C.; Williams F. Nixon

(57) ABSTRACT

Management of spot colors and spot color adjustments includes associating these color printing resources with print conditions, customer accounts, or projects for a printing device. A spot color adjustment is associated with a print condition, a customer account, or a project used for printing operations. A print job is received that specified a selected print condition, a selected customer account, or a selected project. The associated spot color adjustment is determined using these attributes. The spot color adjustment is applied during color printing operations for a document using the spot color. The spot color is printed within the document according to the specified spot color adjustment.

19 Claims, 7 Drawing Sheets

METHODS FOR SMART SPOT COLOR MANAGEMENT IN PRINTING OPERATIONS

FIELD OF THE INVENTION

The present invention relates to a printing device or system for managing the use of spot colors and spot color adjustments for printing documents using the spot colors.

DESCRIPTION OF THE RELATED ART

Spot color libraries define what, in theory, are the optimal values for spot colors. The spot colors are usually defined in L*a*b color space and should result in the best possible color reproduction. In practice, however, print shop customers may have preferences about how their brand colors that are defined as spot colors should be reproduced. The customer preferences may extend to specific jobs as there are higher quality/cost expectations for marketing materials versus billing materials. Currently, paper specific preferences are addressed by assigning specific spot adjustments to specific paper output profiles. Customer-specific preferences are addressed by the use of customer-specific spot colors. For example, instead of using PANTONE 185 C for the spot color definition, the customer may use Kyocera™ Red.

While this is workable, there may be drawbacks to his approach. Use of user-defined spot colors means that the connection to the licensed spot color is lost. This issue may be problematic when it comes to time to determine the optimal spot color values for a new type of paper or substrate. Spot color adjustments for new media would be based on the original licensed color. In order to do this, the print shop must manage the mapping between custom names and licensed names outside of the spot color library. This mapping presents an opportunity for mistakes or for that information to be lost. In addition, current practices require use of additional spot colors for different types of work. There is no way, for example, to define a less saturated brand color for most cost-sensitive jobs and a more saturated brand color for marketing materials.

SUMMARY OF THE INVENTION

A method for performing printing operations is disclosed. The method also includes associating a spot color adjustment for a spot color printable at a printing device with a calibrated paper within a paper catalog for the printing device. The calibrated paper includes a plurality of print conditions. The method also includes further associating the spot color adjustment with a print condition of the plurality of print conditions for the calibrated paper. The method also includes selecting the calibrated paper and the print condition for printing a document. The method also includes applying the spot color adjustment during color printing operations of the document. The method also includes printing the spot color with the document according to the spot color adjustment.

A method for managing printing operations is disclosed. The method also includes associating a spot color adjustment for a spot color printable at a printing device with a customer account within a printing system including the printing device. The method also includes receiving a print job for a document having a print ticket. The print ticket includes the customer account. The method also includes selecting a paper for printing the document according to the print ticket. The method also includes applying the spot color adjustment during color printing operations of the document. The method also includes printing the spot color with the document according to the spot color adjustment.

A method for managing printing operations is disclosed. The method also includes associating a first spot color adjustment for a spot color printable at a printing device with a first project of a plurality of projects within a printing system including the printing device. The method also includes receiving a print job for a document having a print ticket. The print ticket includes the first project. The method also includes selecting a paper for printing the document according to the print ticket. The method also includes applying the first spot color adjustment during color printing operations of the document. The method also includes printing the spot color with the document according to the first spot color adjustment.

In a further embodiment, the method also includes associating a second spot color adjustment with a second project of the plurality of projects. The method also includes receiving the print job having the print ticket. The print ticket includes the second project. The method also includes applying the second spot color adjustment during color printing operations of the document. The method also includes printing the spot color with the document according to the second spot color adjustment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining with the scope of the disclosed embodiments.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Figure 1A:
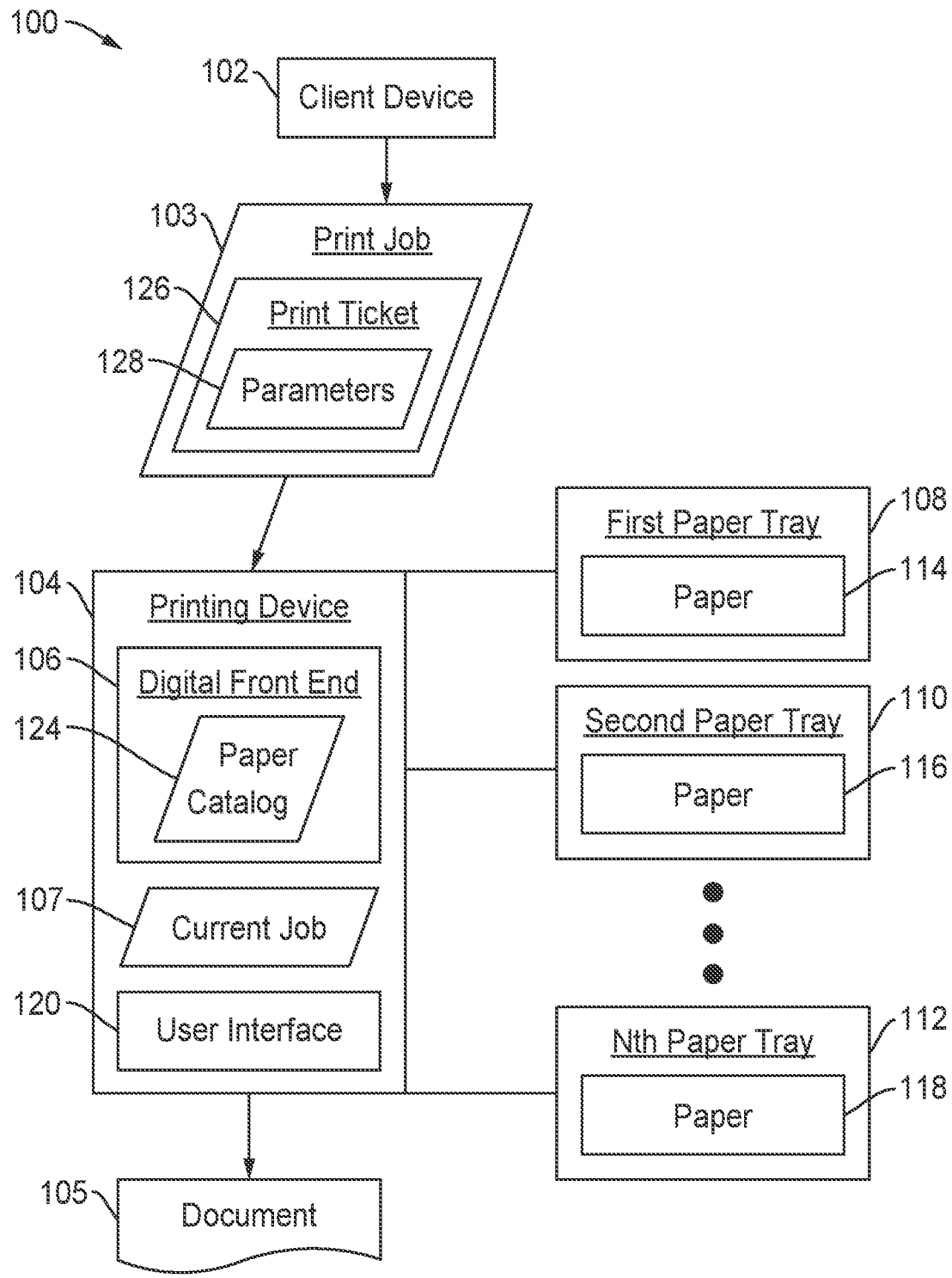
FIG. 1A illustrates a printing system having a printing device for printing documents according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide a system that does not rely on custom spot color names to enable both customer-specific and job type-specific spot color operations. The disclosed embodiments provide a printing system in which all relevant spot color information is managed as additional metadata within the spot color library.

The term "spot colors" may refer to licensed spot colors that have a predefined, case sensitive name and predefined L*a*b values.

The term "spot color aliases" may refer to alternate names for the spot color so that, for example, Kyocera™ Red will use the PANTONE 185 C spot color definition.

The term "spot color adjustments" may refer to changes to the spot color L*a*b value that are only used when the metadata for the print job includes relevant information. These adjustments may be global. These adjustments also may be associated with a media calibration and ICC profiles. For example, the operator may create three different calibration and ICC profile combinations for a given media. The combinations may be economy, standard, and premium. These calibrations and ICC profiles may have different levels of gray component replacement (GCR) and total area coverage. The operator will be able to assign spot color adjustments to each of these calibrations or ICC profiles.

The spot color adjustments may be associated with both a calibrated paper and a print condition. A print condition may refer to a print attribute with configurable values that print shop can set up to allow users and operators to easily indicate different levels of quality. The operator does not have to know anything about color management or remember which calibrations or ICC profiles for use to get a given level of quality, as defined by the print shop. Instead, the operator may select the print condition and media. The disclosed embodiments automatically handle the selection of the current color management.

The disclosed embodiments propose the extension of the embodiments disclosed above to cover spot color adjustments. This feature allows customers to tailor the brand appearance control with the cost and quality tradeoffs of the calibrations and ICC profiles associated with a given print condition. This feature also provides a more comprehensive appearance control without requiring that the operator know anything about spot colors or their adjustments. Once configured, the complete document appearance is controlled by the print condition.

Further, these adjustments may be associated with specific customers. Order management systems contain customer information. This information often is included in the print tickets submitted to printing devices and other production printing devices. Adjustments associated with a customer allow the print shop to reproduce the spot colors as required by a customer without the need to define custom spot colors. As such, customers can use the licensed spot colors available in creative applications. Customers do not have to define and remember to use custom spot color names. The disclosed embodiments automatically will apply customer-specific adjustments when a job's customer information matches the adjustment. This feature is simpler for customers to use and prevents errors as customers may define custom spot color names consistently. The customer association may be made not just for the spot colors but also for calibrations and ICC profiles.

These adjustments also may be associated with specific customer projects. Order management systems may contain project information. This information may be included with the print ticket information submitted to printing devices and to other production printing devices. Adjustments associated with a project allow customers to make quality or cost tradeoffs for specific recurring jobs, such as monthly statements. These adjustments also allow operators to make the correct quality or cost adjustment without having to remember specific details for either the customer or the specific project. The operator selects the correct information and the printing system selects the correct spot color adjustments, as disclosed above. As with customer-specific adjustments, this feature is simpler for customers to use as they can use the licensed libraries. It also prevents errors as customers may define custom spot color names consistently. The project association may be made not just for spot colors but also for calibrations and ICC profiles.

When a job is submitted to the printing device, the operator need only specify media and one or more of the following: print condition, customer, and project. The disclosed embodiments automatically will find the correct calibrations, ICC profiles, and spot colors. There is no opportunity for the operator or customer to select incorrect printing resources. In addition, there is no requirement that the customer do anything other than use universally available spot color definitions. This feature simplifies things for operators while at the same time reducing the opportunity for errors.

FIG. 1A depicts a printing system 100 for printing documents according to the disclosed embodiments. Printing system 100 includes printing device 104. Printing device 104 is disclosed in greater detail below. Printing device 104 may receive one or more print jobs 103 within printing system 100. For example, client device 102 may generate and send print job 103 to printing device 104. In some embodiments, printing device 104 may be a production printing device in that print jobs are provided through client device 102, which is attached to the printing device. Such a print job may require 1000s of pages or even 100,000 pages or more.

Print job 103 may include a print ticket 126 that sets forth one or more parameters 128 for the print job. For example, print ticket 126 may specify a size for a sheet of print job 103 as well as weight, quality of paper, color of paper, punched holes, and the like. The operator may generate print ticket 126 when submitting print job 103 for printing within printing system 100. Information from print ticket 126, such as one or more parameters 128, may be used to generate a list of recommended papers to display for print job 103.

Printing device 104 may receive print job 103 as it is processing and printing current job 107. Current job 107 may use different paper or media than print job 103. As such, printing device 104 may include a plurality of paper trays to supply papers of various types, sizes, weights, and the like. Thus, printing device 104 includes first paper tray 108 having paper 114, second paper tray 110 having paper 116, and so on to Nth paper tray 112 having paper 118. Current job 107 may use paper from one or more of these paper trays. In some embodiments, paper 114, paper 116, and paper 118 are different types of paper or different media. For example, current job 107 may use paper 116 from second paper tray 110 while print job 103 may require paper 114 from first paper tray 108.

User interface 120 may be in operation panel 208, disclosed below, or part of digital front end (DFE) 106. DFE 106 is disclosed in greater detail below. DFE 106 may process print jobs and act as a controller for printing device 104. Alternatively, user interface 120 may be displayed on client device 102. The disclosed embodiments may use user interface 120 to select papers for print job 103.

DFE 106 also includes paper catalog 124. Paper catalog 124 is configured to organize and store existing calibration data and ICC profiles for a plurality of papers. Upon selection of a paper for printing at printing device, paper catalog 124 may be accessed to complete print job 103 according to the expectations associated with the print job. Paper catalog 124 is disclosed in greater detail below by FIG. 3. In some embodiments, DFE 106 may include multiple paper catalogs. Further, paper catalog 124 also may be stored in another component within printing system 100 and accessible by DFE 106.

As a result of print job 103 being received and processed by printing device 104, document 105 is printed on one of papers 114, 116, or 118. Print ticket 126 and parameters 128 also may be implemented in printing document 105. For example, print ticket 126 may instruct printing device 104 to use paper 114 from first paper tray 108. Further, paper 114 will have a corresponding entry in paper catalog 124. Paper catalog 124 may include the color printing resources to print document 105. In some embodiments, document 105 may have one or more spot colors printed thereon.

Figure 1B:
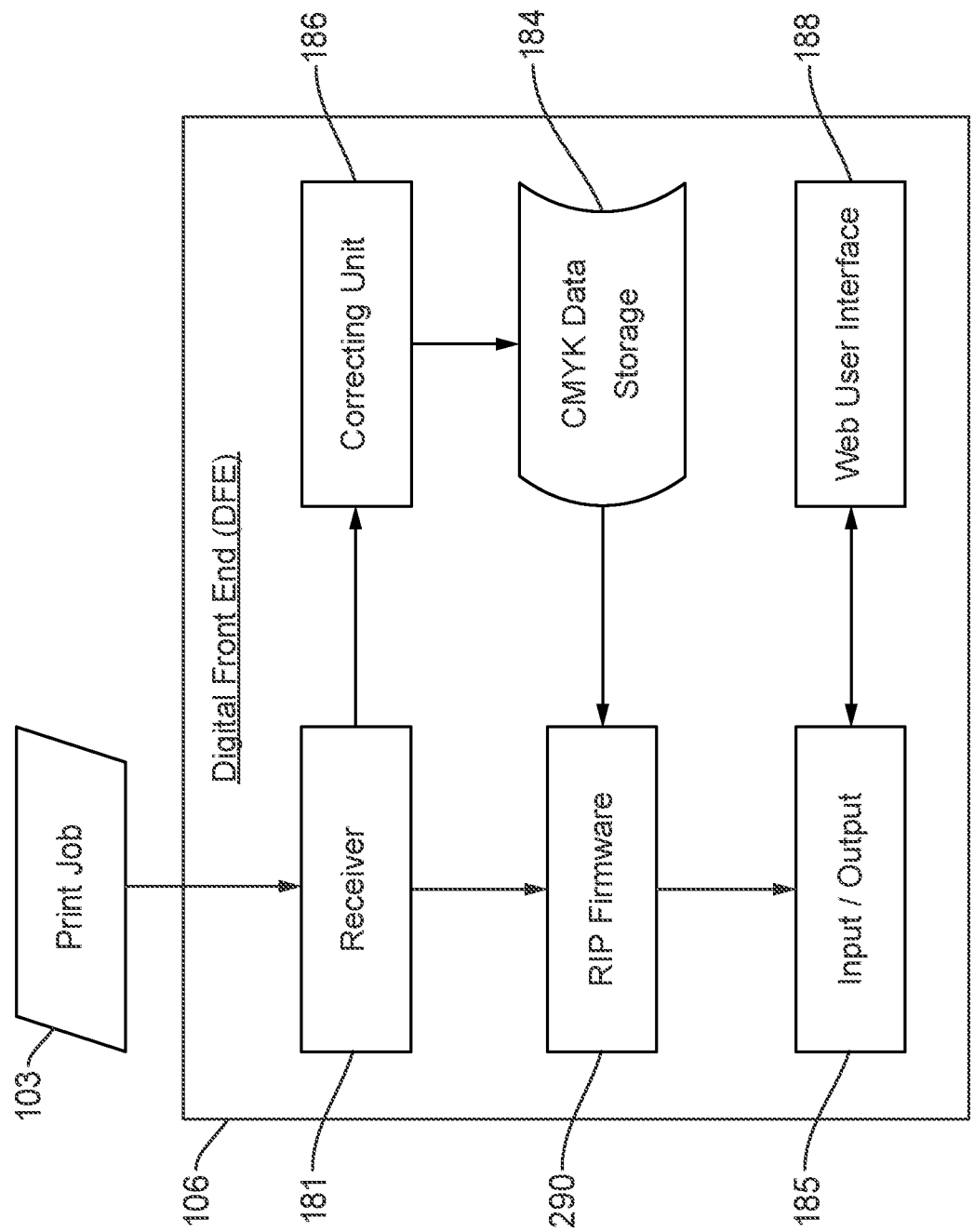
FIG. 1B illustrates a digital front end (DFE) for a printing device according to the disclosed embodiments.

FIG. 1B depicts a block diagram of DFE 106 according to the disclosed embodiments. DFE 106 includes a receiver 181, a RIP firmware 290, a CMYK data storage 184, an input/output connector 185, and a correcting unit 186. Additional components within DFE 106 may be implemented, as disclosed above and below.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 may be transmitted within printing system 100 via input/output connector 185. The print condition information and the print medium type, as well as the rendering data, may be transmitted to a selected printing device within printing system 100. As disclosed above, the rendered data may be in a file format acceptable for a printing device such that the print job is provided directly to the print engine of the printing device.

DFE 106 also includes web user interface 188 that may communicate with other devices within printing system 100, if it is located at a separate device, using, for example, input/output connector 185. Web user interface 188, or web application, allows a user of the DFEs of other printing devices to interact with content or software running on DFE 106.

Figure 2:
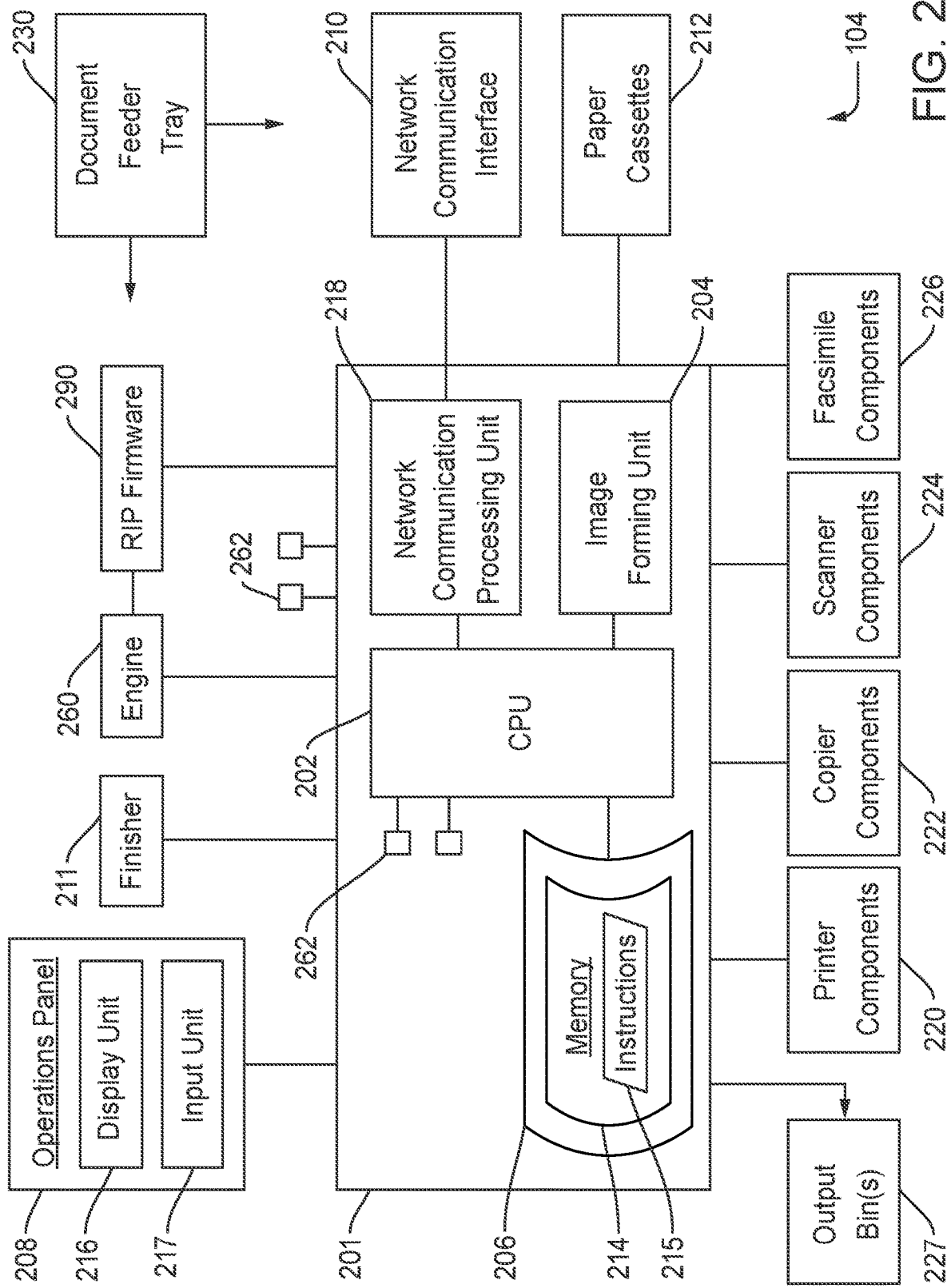
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from DFE 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays, shown as paper trays 108, 110, and 112 in FIG. 1A. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from DFE 106, if applicable. DFE 106 may send calibration and paper catalog information to printing device 104 for display. For example, the operator at DFE 106 may send a calibration to printing device 104. Printing device 104 displays paper type and any other information needed to complete the calibration.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device. Memory unit 206 may store the history of failure events and occurred errors with a timestamp of each error.

Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from DFE 106 as well as other devices within system 100.

Figure 3:
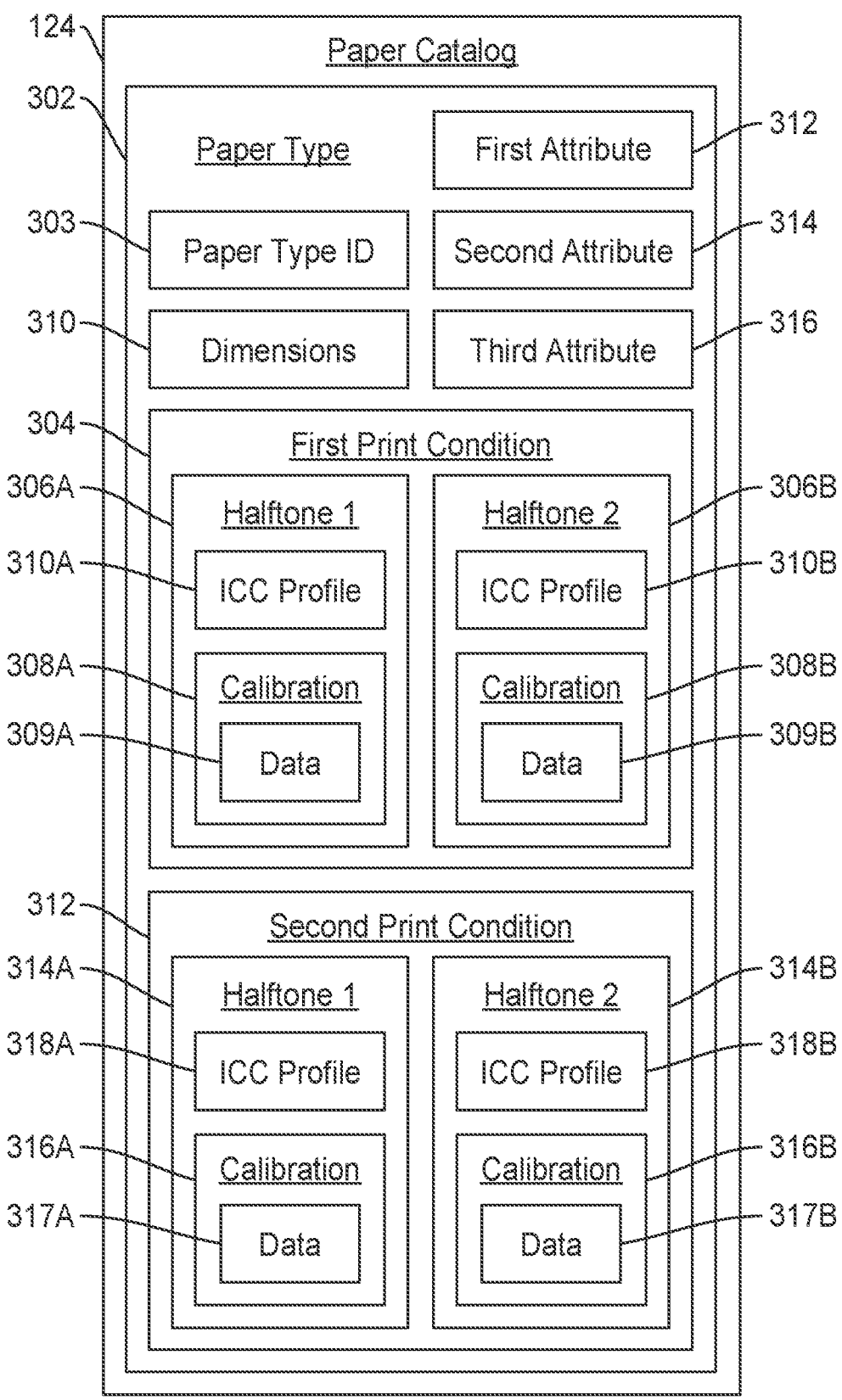
FIG. 3 illustrates a block diagram of a paper catalog for use within the printing system according to the disclosed embodiments.

FIG. 3 depicts a block diagram of paper catalog 124 for use within printing system 100 according to the disclosed embodiments. As disclosed above, paper catalog 124 may reside within DFE 106 of printing device 104. In other embodiments, paper catalog 124 may reside in another component within printing system 100, such as client device 102 or an external server. For brevity, paper catalog 124 is disclosed below as residing within DFE 106.

For each paper type used for a particular model of printing device 104, there are a set of items that work together to achieve optimal reproduction capabilities. These items may be represented in paper catalog 124. An example of an entry in paper catalog for a paper type 302 may be shown. Paper catalog may include hundreds or thousands of such entries. Paper type 302 may be identified within paper catalog 124 by paper type identification 303. In some embodiments, paper type identification 303 may be a unique symbol or code that identifies paper type 302 within paper groups, disclosed in greater detail below.

Paper type 302 includes print conditions. Print conditions may be applied to print jobs using paper type 302. Examples of print conditions may be high quality, default, ink saving, and the like. Other examples include premium, standard, and economy. Each print condition may include its own color printing resources, such as calibrations, calibration source data, and ICC profiles. Application of a print condition results in a different result for a print job using paper type 302 at printing device 104. For example, a high quality print condition will differ in some fashion as a finished, printed document from one printed using the default print condition.

As shown in FIG. 3, paper type 302 may include first print condition 304. It also may include additional print conditions. First print condition 304 may relate to the high quality print condition for printing paper type 302 at printing device 104. Within print condition, halftones, or halftone designs, may be defined. Printing device 104 may have one or more halftones. Halftones are binary on/off dot patterns of each ink to mimic continuously varying transitions. One halftone could emphasize details in the image, while another could be best for smooth transitions. Thus, first print condition 304 includes halftone 306A and halftone 306B. For example, halftone 306A may correspond to the halftone design to emphasize details in the image being printed. Halftone 306B may correspond to the halftone design to provide for smooth transitions.

For each halftone, the print shop should capture the desired per-colorant behavior over all shades of that colorant. By behavior, the disclosed embodiments refer to the color measurement. The record of these colorant behaviors, and the information that allows printing device 104 to be adjusted back to such behaviors, are stored as calibration data. These adjustments may vary linearly or with a curve. The calibration data include characteristics of each ink under the halftone selected. Thus, halftone 306A includes calibration 308A having calibration data 309A and halftone 306B includes calibration 308B having calibration data 309B.

Further, with a selected halftone, the associated calibration, and the calibration data enforced to produce desired behavior of each colorant, the disclosed embodiments then create an ICC profile to fully characterize how ink combinations relate to standardized color measurements, as disclosed above. It is via the ICC profile that, for the specific paper-halftone-calibration-data set up, printing device 104 can reproduce the colors, text, and parameters of the original document. The process for generating an ICC profile is disclosed above. Thus, halftone 306A includes ICC profile 310A and halftone 306B includes ICC profile 310B.

Often printing systems have additional "dials" for more customized controls. For instance, there are settings of total ink amounts allowed in the ICC profile for preserving the glossy finish of a paper. Alternatively, it could be a very conservative expectation of the black ink response set into the calibration data. These more specific customizations may be identified as print conditions. In the scheme of the aforementioned items affecting color management, the disclosed embodiments place print conditions at the highest tier under each paper type, as shown in FIG. 3 by first print condition 304.

Paper catalog entry 302 also may include color printing resources for a second print condition 312 of the paper. Second print condition 312 may relate to standard quality prints using the paper for paper catalog entry 302. Standard quality is not priced as high as the high quality for first print condition 304. Thus, different color printing resources are used for second print condition 312. Second print condition 312 includes halftones 314A and 314B. Halftone 314A includes calibration 316A having calibration data 317A. Calibration 316A is associated with ICC profile 318A for halftone 314A. Halftone 314B includes calibration 316B having calibration data 317B. Calibration 316B is associated with ICC profile 318B for halftone 314B.

For example, a print job may specify using print ticket 126 to use paper 114 of first paper tray 108. Paper 114 is a calibrated paper in that it corresponds to a paper catalog entry 302 within paper catalog 124. Print ticket 126 also may specify a print condition for high quality service, which corresponds to first print condition 304 in paper catalog entry 302. Print ticket 126 also may include a parameter 128 calling for halftone 306A. Thus, document 105 is printed at printing device 104 using calibration 308A and ICC profile 310A using paper 114.

Using the above example, another print job is received that specifies using print ticket 126 to use paper 114 of first paper tray 108 as well, but it also specifies a print condition for standard quality service. This print condition corresponds to second print condition 312 in paper catalog entry 302. Print ticket 126 also may include a parameter 128 calling for halftone 314B. Document 105 is printed at printing device 104 using calibration 316B and ICC profile 318B using paper 114. When compared to the document printed using first print condition 304, this document should not be as good. The color printing reproduction quality may be less as the calibration and ICC profile does not require as stringent values for higher quality color reproduction.

Paper type 302 along with first print condition 304 and second print condition 312 may refer to the print management resources and items for one paper type. In a print shop, for each model of printing device 104, there may be dozens or more paper types in use. To keep track of the print management items for all these papers, paper catalog 124 may be implemented in system 100. As disclosed above, paper catalog 124 may be a software data storage system that archives all the color management items and resources for each paper type in use. When a print job is specified on a particular paper, identified as paper type identification 303, under a chosen print condition 302 employing halftone 306A, paper catalog 124 will provide the proper corresponding calibration 308A and ICC profile 310A for printing device 104 to use. If the print job specifies print condition 302 employing halftone 306B, then paper catalog 124 will provide calibration 308B and ICC profile 310B for printing device 104 to use for the print job.

The entry for paper type 302 also may include dimensions 310, such as length and width of a sheet of the paper type. Dimensions 310 may be a standard size of paper or a non-standard size. Paper type 302 also may include one or more attributes for the paper. For example, first attribute 312 may be the weight of a sheet of paper type 302. First attribute 312 may be 120 grams per square meter (gsm). Heavier paper is reflected by a higher number for gsm. Generally, heavier paper is associated with a higher quality of stock. It should be noted that dimensions 310 may also be considered an attribute of paper type 302. Further, first attribute 312 may be considered a dimension of paper type 302.

Paper type 302 also may include second attribute 314 and third attribute 316. These attributes may pertain some other feature of the paper of paper type 302 aside from dimensions and weight. Second attribute 314 may refer to the color of the paper for paper type 302, such as white, blue, yellow, and the like. Third attribute 316 may refer to a feature of the paper of paper type 302, such as recycled, new, and the like. Other potential attributes may be glossy or matte paper.

Dimensions and attributes within paper catalog 124 may not necessarily match the attributes for paper trays 108, 110, and 112. Paper trays 108, 110, and 112 also may have attributes that apply to print job 103 as specified by print ticket 126. Dimensions 310 may be included in print ticket 126. Dimensions 310 also may apply to a parameter within paper catalog 124 and paper trays 108, 110, and 112. The other attributes, however, within paper catalog 124 may not apply to any attribute for paper trays 108, 110, and 112.

Figure 4:
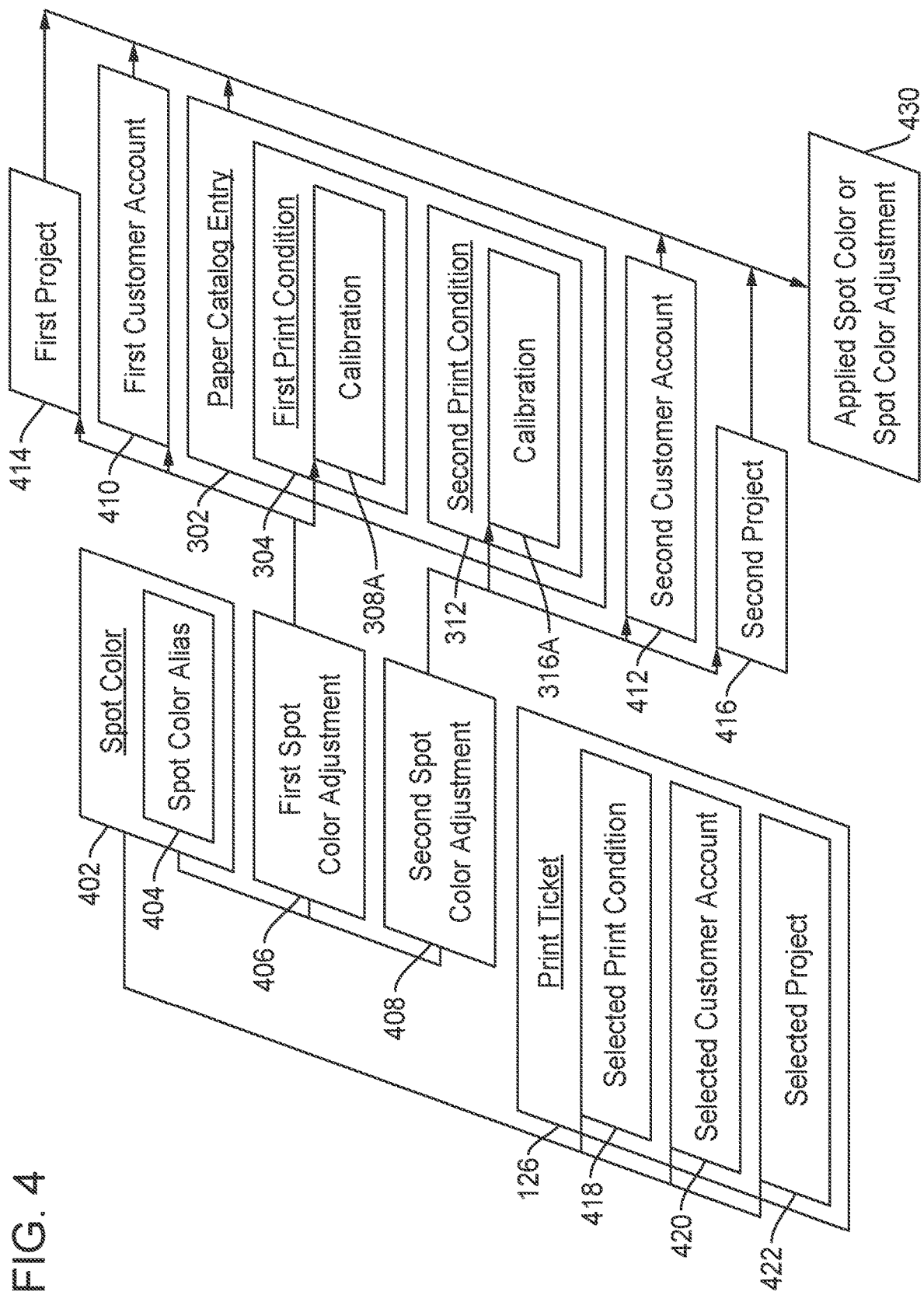
FIG. 4 illustrates a block diagram of smart spot color management in printing operations according to the disclosed embodiments.

FIG. 4 depicts a block diagram of smart spot color management in printing operations according to the disclosed embodiments. Spot colors, along with print conditions and calibrations or ICC profiles, are used extensively in printing operations. The disclosed embodiments manage spot colors within color printing resources, customer accounts, and projects without relying on custom spot color names or operator intervention to enable both customer-specific and project-specific color printing. The disclosed embodiments manage relevant spot color information as additional metadata with the spot color library.

Spot color 402 may one of the spot colors within a spot color library available at printing device 104 or within printing system 100. Spot color 402 is a licensed spot color that has a predefined, case sensitive name and predefined L*a*b values to provide a unique color usually associated with a brand. Spot color 402 is defined to be the same no matter which printing device is printing the color. Spot color 402 also includes spot color alias 404. Spot color alias 404 is an alternate name for spot color 402. The print shop may have its own name for the color of spot color 402 so spot color alias 404 reflects this relationship. Spot color 402 may include several spot color aliases 404.

Spot color 402 also may be associated with spot color adjustments. Operators or customers may adjust spot color 402 to be used as needed. Further, adjustments may be made based on a quality level of the spot color use in a document. Printing device 104 also may require some adjustment to the original L*a*b value for spot color 402 to have it properly reproduced at the printing device. First spot color adjustment 406 and second spot color adjustment 408 may reflect the adjustments to the L*a*b value of spot color 402. In printing operations, first spot color adjustment 406 or second spot color adjustment 408 may be used instead of spot color 402.

According to the disclosed embodiments, the spot color and the spot color adjustments are associated with a calibrated paper and a print condition. A print condition is a print attribute within a paper catalog entry with configurable values so a print shop can allow operators to easily indicate different levels of quality. As shown in FIG. 3, a print condition may include its own calibration and ICC profile. Here, spot color 402 or a spot color adjustment also may be associated with a print condition.

Thus, when a print job includes spot color 402, the disclosed embodiments may use a selected print condition 418 to apply any adjustments through DFE 106 or print processing without having to specify the adjustments. This feature allows customers to tailor the brand appearance to align with the cost or quality tradeoffs of the calibrations and ICC profiles associated with a given print condition. This feature also provides a more comprehensive appearance control without requiring that the operator know anything about spot color 402 or first spot color adjustment 406 and second spot color adjustment 408. Once configured, the appearance of spot color 402 within document 105 is controlled by selected print condition 418.

As shown in FIG. 4, first spot color adjustment 406 is associated with first print condition 304 of a calibrated paper, or paper catalog entry 302. First spot color adjustment 406 also may be associated with calibration 308A of first print condition 304. Calibration 308A is the calibration for halftone 306A of first print condition 304. Referring back to FIG. 3, first print condition 304 also includes halftone 306B and calibration 308B, but these are not shown here. In some embodiments, first spot color adjustment 406 may be associated with these resources as well.

Second spot color adjustment 408 is associated with second print condition 312 and calibration 316A of halftone 314A. In some embodiments, second spot color adjustment 408 may be associated with other calibrations in second print condition 312. Selected print condition 418 of print ticket 126 may specify first print condition 304 or second print condition 312 for the calibrated paper of paper catalog entry 302. As disclosed above, first print condition 304 may correspond to high quality or premium color printing reproduction, including the level of quality for reproducing spot color 402. Second print condition 312 may correspond to standard quality color printing reproduction, including the level of quality for reproducing spot color 402. Further, these quality levels also may correspond to pricing of print jobs using the calibrated paper of paper catalog entry 302.

For example, selected print condition 418 may indicate that second print condition 312 is desired for print job 103. The customer selected the standard quality print condition. The operator does not need to look up second spot color adjustment 408 or even spot color 402, or spot color alias 404. The disclosed embodiments associate second print condition 312 with calibration 316A and second spot color adjustment 408. Using the disclosed process, applied spot color or spot color adjustment 430 is identified and applied when printing document 105. Spot color 402 through spot color adjustment 408 is reproduced as applied spot color or spot color adjustment 430 within document 105 along with the application of calibration 316A and ICC profile 318A.

In some embodiments, the spot color adjustments may be associated with specific customers. Printing system 100 or DFE 106 of printing device 104 contains customer information. This information may be included with print ticket 126 submitted with print job 103. Spot color adjustments associated with a customer allow printing system 100 to reproduce spot color 402 as desired for a customer without the need to define custom spot colors.

Thus, first spot color adjustment 406 is associated with first customer account 410. Second spot color adjustment 408 is associated with second customer account 412. Customers tied to these accounts may use the licensed spot colors available in applications. Customers will not have to define and remember to use spot color names when submitting print jobs within printing system 100. The disclosed embodiments automatically apply first spot color adjustment 406, second spot color adjustment 408, and other spot color adjustments when selected customer account 420, or customer information, matches a customer account within printing system 100.

For example, print ticket 126 includes selected customer account 420 for using spot color 402. The applicable customer account will determine which spot color adjustment to use. Selected customer account 420 may identify first customer account 410 as the customer for color printing of print job 103. Spot color 402 or spot color alias 404 is desired to be used in color printing operations. Based on selected customer account 420, first spot color adjustment 406 is applied for print job 103. Using the disclosed process, applied spot color or spot color adjustment 430 is identified and applied when printing document 105. Spot color 402 through first spot color adjustment 406 is reproduced as applied spot color or spot color adjustment 430 within document 105 along with the application of calibration 308A and ICC profile 310A.

This feature is simpler for customers to use. Customers may still use the licensed libraries. It also prevents errors as the spot color adjustments are defined consistently for applied spot color or spot color adjustment 430. This customer association also may be made for calibrations and ICC profiles for calibrated papers within paper catalog 124 in addition to spot colors.

In other embodiments, the spot color adjustments may be associated with specific projects for a customer or recurring projects within printing system 100. Much like customer accounts, different projects may apply different spot color adjustments. Printing system 100 or DFE 106 of printing device 104 contains project information. This information may be included with print ticket 126 submitted with print job 103. Spot color adjustments associated with a project allow customers or printing system 100 to make quality or cost tradeoffs for recurring jobs. These adjustments also allow operators or customers to make the correct quality or cost adjustment without having to remember specific details for either the customer or the specific project. The operator identifies selected project 422 in print ticket 126 and printing system 100 or DFE 106 selects the correct spot color adjustment.

For example, first spot color adjustment 406 is associated with first project 414. Second spot color adjustment 408 is associated with second project 416. Customers may define different spot color adjustments for their projects. Perhaps first spot color adjustment 406 is for higher priced print jobs and second spot color adjustment 408 is for standard print jobs. Thus, first project 414 may be a higher priced recurring print job that is associated with first spot color adjustment 406, such as marketing flyers or store posters. Second project 416 may be a standard priced recurring print job that is associated with second spot color adjustment 408, such as monthly statements.

Print ticket 126 may include selected project 422, which identifies a project associated with print job 103. The applicable project will determine which spot color adjustment to use. Selected project 422 may identify second project 416 as the project applicable for print job 103. Based on selected project 422, second spot color adjustment 408 is applied for color printing of print job 103. Selected project 422 indicates that print job 103 is standard print job, or second project 416. Using the disclosed process, applied spot color or spot color adjustment 430 is identified and applied when printing document 105. Spot color 402 through second spot color adjustment 408 is reproduced as applied spot color or spot color adjustment 430 within document 105 along with the application of calibration 316A and ICC profile 318A.

As with the use of selected customer account 420, use of selected project 422 is simpler for customers and operators to use and prevents errors as the spot colors for projects are defined consistently. The project association to spot color adjustments also may be made for calibrations and ICC profiles for calibrated papers within paper catalog 124.

Thus, when print job 103 is submitted within printing system 100 or to printing device 104, the operator may only specify the media, or paper, and one or more of the following: selected print condition 418, selected customer account 420, and selected project 422. Print ticket 126 may include only one of those attributes to identify applied spot color or spot color adjustment 430. The disclosed embodiments will automatically find the correct calibrations, ICC profiles, and spot colors to be used in printing operations. These features remove the risk of the operator selecting the incorrect resources. They also simplify color printing operations for customers and operators while at the same time reducing the opportunity for errors.

Figure 5:
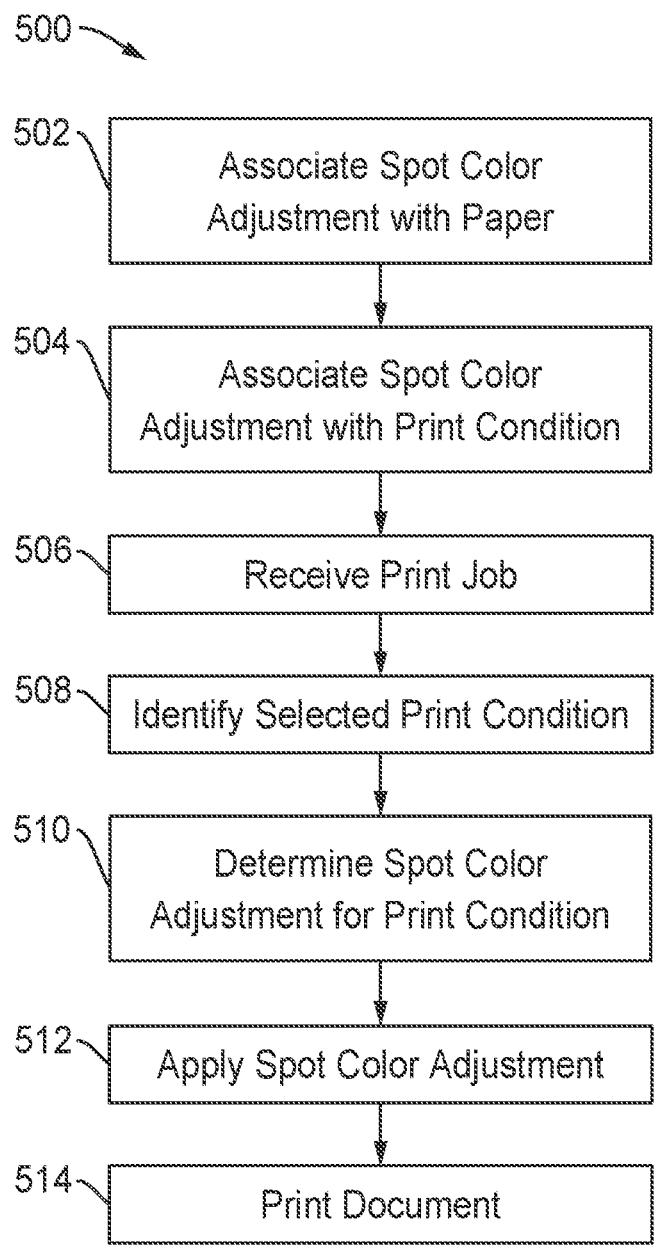
FIG. 5 illustrates a flowchart for managing the application of a spot color adjustment using a selected print condition according to the disclosed embodiments.

FIG. 5 depicts a flowchart 500 for managing the application of a spot color adjustment using a selected print condition according to the disclosed embodiments. Flowchart 500 may refer to FIGS. 1A-4 for illustrative purposes. Flowchart 500, however, is not limited to the embodiments disclosed by FIGS. 1A-4.

Step 502 executes by associating a spot color adjustment for spot color 402 with a calibrated paper, such as one in paper catalog 124. Paper catalog entry 302 may be the calibrated paper. For example, paper catalog entry 302 may correspond to paper 114 in first paper tray 108. First spot color adjustment 406 may be associated with paper catalog entry 302. Second spot color adjustment 408 also may be associated with paper catalog entry 302. Therefore, when spot color 402 is required for print jobs using paper 114, first spot color adjustment 406 or second spot color adjustment 408 may be applied.

Step 504 executes by associating the spot color adjustment with a print condition for the calibrated paper. Paper catalog entry 302 may include a plurality of print conditions, as disclosed above. A spot color adjustment is associated with one of the print conditions for paper catalog entry 302. For example, first spot color adjustment 406 is associated with first print condition 304. First print condition 304 may include halftones 306A and 306B. As first print condition 304 relates to a quality attribute for a print job 103, first spot color adjustment 406 may be associated with calibrations 308A and 308B for halftones 306A and 306B, respectively.

Step 506 executes by receiving a print job 103. Preferably, print job 103 includes print ticket 126. Print ticket 126 may include parameters 128, which also includes one or more attributes for print job 103. One attribute may be selected print condition 418. Step 508 executes by identifying selected print condition 418 for print job 103. Paper 114 of paper catalog entry 302 may have more than one print condition for the quality applicable for print job 103. Using the examples above, selected print condition 418 may identify first print condition 304 or second print condition 312.

Step 510 executes by determining the applicable spot color adjustment for the print condition specified by selected print condition 418. This process is performed by determining which spot color adjustment is associated with the print condition identified by selected print condition 418. If it is first print condition 304, then first spot color adjustment 406 is to be used. If it is second print condition 306, then second spot color adjustment 408 is to be used.

Step 512 executes by applying the determined spot color adjustment for spot color 402 in processing print job 103. Print job 103 is processed using the color printing resources associated with the selected print condition along with the associated spot color adjustment. For example, for first print condition 304, first spot color adjustment 406 is applied in color printing operations for print job 103. Step 514 executes by printing document 105 with spot color 402 according to the spot color adjustment determined above. Using the above example, first spot color adjustment 406 is applied in printing document 105 using spot color 402.

Figure 6:
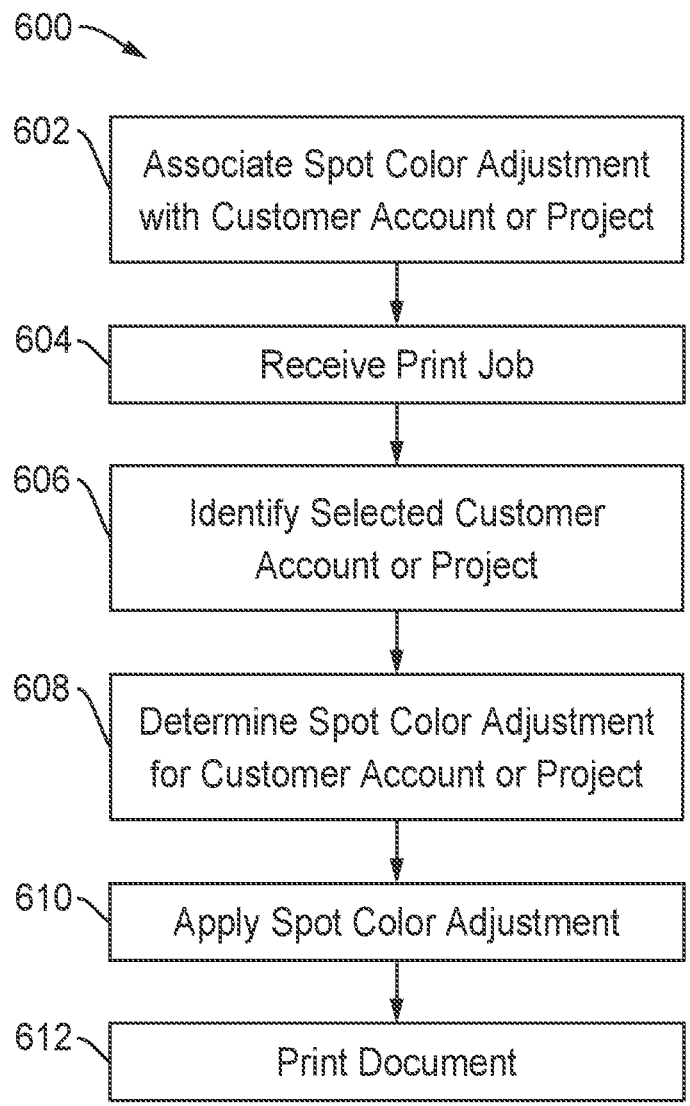
FIG. 6 illustrates a flowchart for managing the application of a spot color adjustment using a selected customer account or a selected project according to the disclosed embodiments.

FIG. 6 depicts a flowchart 600 for managing the application of a spot color adjustment using a selected customer account or a selected project according to the disclosed embodiments. Flowchart 600 may refer to FIGS. 1A-5 for illustrative purposes. Flowchart 600, however, is not limited to the embodiments disclosed by FIGS. 1A-5.

Step 602 executes by associating a spot color adjustment for spot color 402 with a customer account or a project within printing system 100 or printing device 104. Multiple customer accounts or projects may be used for printing operations. Spot color adjustments for spot color 402 may be associated with the customers accounts or projects. For example, first spot color adjustment 406 may be associated with first customer account 410 or first project 414. Second spot color adjustment 408 may be associated with second customer account 412 or second project 416. Use of the different spot color adjustments may account for the different quality levels applicable to the different customer accounts or projects.

Step 604 executes by receiving print job 103 within printing system 100 or at printing device 104. Preferably, print job 103 includes print ticket 126. Print ticket 126 may include parameters 128, which also includes one or more attributes for print job 103. One attribute may be selected customer account 420 or selected project 422. Selected customer account 420 may refer to first customer account 410 or second customer account 412. Selected project 422 may refer to first project 414 or second project 416.

Step 606 executes by identifying selected customer account 420 or selected project 422 from print ticket 126 for print job 103. These attributes indicate which customer account or project corresponds to print job 103 for printing operations. If the attribute is selected customer account 420, then first customer account 410 or second customer account is identified. If the attributes are selected project 422, then first project 414 or second project 416 is identified.

Step 608 executes by determining the spot color adjustment for the customer account identified by selected customer account 420 or the project identified by selected project 422. As disclosed above, first spot color adjustment 406 and second spot color adjustment 408 are associated with specific customer accounts or projects. Depending on which customer account or project is specified for print job 103, one of the spot color adjustments are determined to be applied for printing operations.

For example, if first customer account 410 or first project 414 is identified, then first spot color adjustment 406 is determined to be used for spot color 402. If second customer account 412 or second project 416 is identified, then second spot color adjustment 408 is determined to be used for spot color 402.

Step 610 executes by applying the determined spot color adjustment in printing operations for print job. Print job 103 is processed using the color printing resources associated with the selected customer account or project along with the associated spot color adjustment. For example, for first customer account 410 or first project 414, first spot color adjustment 406 is applied in color printing operations for print job 103. Step S612 executes by printing document 105 with spot color 402 according to the spot color adjustment determined above. For example, first spot color adjustment 406 is applied in printing document 105 using spot color 402 for a print job corresponding to first customer account 410 or first project 414.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for performing printing operations, the method comprising:
associating a first spot color adjustment for a spot color printable at a printing device with a calibrated paper within a paper catalog for the printing device, wherein the calibrated paper includes a plurality of print conditions;
further associating the first spot color adjustment with a first print condition of the plurality of print conditions for the calibrated paper;
selecting the calibrated paper and the first print condition for printing a document;
applying the first spot color adjustment during color printing operations of the document;
printing the spot color with the document according to the first spot color adjustment;
associating a second spot color adjustment with a second print condition of the plurality of print conditions;
selecting the calibrated paper and the second print condition for printing the document;

applying the second spot color adjustment during color printing operations of the document; and printing the spot color with the document according to the second spot color adjustment.

2. The method of claim 1, wherein the calibrated paper includes a calibration within the paper catalog.

3. The method of claim 2, wherein the calibration is assigned to the first print condition for the calibrated paper within the paper catalog.

4. The method of claim 1, wherein the calibrated paper includes an ICC profile within the paper catalog.

5. The method of claim 4, wherein the ICC profile is assigned to the first print condition for the calibrated paper within the paper catalog.

6. The method of claim 1, further comprising adjusting the spot color to generate the first spot color adjustment.

7. The method of claim 1, further comprising associating the first spot color adjustment with a customer account or project using the printing device.

8. A method for managing printing operations, the method comprising:
  associating a first spot color adjustment for a spot color printable at a printing device with a first customer account within a printing system including the printing device;
  receiving a print job for a document having a print ticket, wherein the print ticket includes the first customer account;
  selecting a paper for printing the document according to the print ticket;
  applying the first spot color adjustment during color printing operations of the document;
  printing the spot color with the document according to the first spot color adjustment;
  associating a second spot color adjustment with a second customer account;
  receiving the print job having the print ticket, wherein the print ticket includes the second customer account;
  applying the second spot color adjustment during color printing operations of the document; and
  printing the spot color with the document according to the second spot color adjustment.

9. The method of claim 8, wherein the paper selected to print the document is a calibrated paper within a paper catalog for the printing device, wherein the calibrated paper includes a plurality of print conditions.

10. The method of claim 9, wherein the customer account and the first spot color adjustment are associated with a print condition of the plurality of print conditions.

11. The method of claim 9, wherein the calibrated paper includes a calibration or an ICC profile within the paper catalog.

12. The method of claim 8, wherein the first customer account includes a plurality of customer projects.

13. The method of claim 12, further comprising associating the first spot color adjustment to a customer project of the plurality of customer projects for the customer account.

14. The method of claim 13, wherein the customer project is included include with the print ticket for the print job.

15. A method for managing printing operations, the method comprising:
  associating a first spot color adjustment for a spot color printable at a printing device with a first project of a plurality of projects within a printing system including the printing device;
  receiving a print job for a document having a print ticket, wherein the print ticket includes the first project;
  selecting a paper for printing the document according to the print ticket;
  applying the first spot color adjustment during color printing operations of the document;
  printing the spot color with the document according to the first spot color adjustment;
  associating a second spot color adjustment with a second project of the plurality of projects;
  receiving the print job having the print ticket, wherein the print ticket includes the second project;
  applying the second spot color adjustment during color printing operations of the document; and
  printing the spot color with the document according to the second spot color adjustment.

16. The method of claim 15, wherein the paper selected to print the document is a calibrated paper within a paper catalog for the printing device, wherein the calibrated paper includes a plurality of print conditions.

17. The method of claim 16, wherein the first spot color adjustment is associated with a print condition of the plurality of print conditions.

18. The method of claim 17, wherein the print ticket includes the first project and the print condition that is associated with the first spot color adjustment.

19. The method of claim 15, wherein the first project corresponds to a customer account.

\* \* \* \* \*